Figure 1:
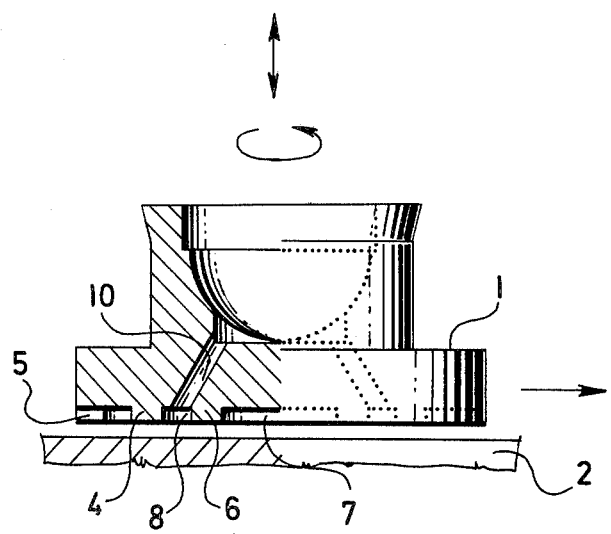

United States Patent [19]

Turza et al.

[11] 4,371,217
[45] Feb. 1, 1983

[54] HYDROSTATIC SLIDING ELEMENT

[75] Inventors: Jozef Turza; Ondrej Kilik; Ján Rusnák, all of Nova Dubnica, Czechoslovakia

[73] Assignee: Zavody tazkeho strojarstva, narodni podnik, Dubnica nad Vahom, Czechoslovakia

[21] Appl. No.: 274,412

[22] Filed: Jun. 17, 1981

[30] Foreign Application Priority Data

Jun. 30, 1980 [CS] Czechoslovakia ............ 4644-80

[51] Int. Cl.³ ........................................... F16C 17/00
[52] U.S. Cl. .............................. 308/5 R; 277/DIG. 5
[58] Field of Search ............... 277/3, DIG. 5; 308/9, 308/DIG. 1

[56] References Cited

U.S. PATENT DOCUMENTS 3,475,065 10/1969 Weichsel ............................ 308/9
3,744,858 7/1973 Weichsel ..................... 308/DIG. 1
3,973,810 8/1976 Montag ............................... 308/9
4,269,458 5/1981 Olsson et al. ....................... 308/9

Primary Examiner—Robert I. Smith

[57] ABSTRACT

A hydrostatic sliding element serving for a contactless transmission of forces between two movable elements by means of a liquid which fills in the gap between the movable elements. The sliding element has a correction ring with a central correction recess, and a packing ring outwardly of the central recess, the correction ring being separated from the packing ring by a circular groove connected to inlets of pressure liquid. Hitherto known embodiments of hydrostatic sliding elements have a round outside shape, being provided in the central part with a round recess into which an inlet duct is mouthed, or they consist of a packing ring provided with auxiliary rings having intermittent grooves. Their drawback is a relatively low rigidity as well as the possibility of a direct contact between the sliding element and supporting plate which may cause damage.

3 Claims, 2 Drawing Figures

HYDROSTATIC SLIDING ELEMENT

The invention relates to a hydrostatic sliding element serving for a contactless transmission of forces between two movable elements by means of a liquid which fills in the gap between the movable elements.

Hydrostatic sliding elements are applied for seating movable parts of machines, for sliding elements of axial converters and radial ones, as well as for distribution systems of liquids. The simplest hitherto known embodiment of a hydrostatic sliding element is a sliding element having a round outside shape, being provided in the central part with a round recess into which an inlet duct is mouthed. There are also known hydrostatic sliding elements consisting of a packing ring the inner or outer circumference of which is provided with auxiliary rings having intermittent grooves. The loading force, mostly variable in time, is balanced by a force which results from a pressure distribution under the packing ring cuased by a liquid flow. Hitherto known sliding elements work under conditions wherein the frequency of the exciting force is equal to the proper frequency of the hydrostatic sliding element with its connected parts. Their drawback resides in the fact that in this area their dynamic rigidity is decreased. So great deviations of the gap take place between the sliding element and the supporting plate that contact of the sliding element and support plate may occur. If their material is not sufficiently hard, a mechanical damage may take place; this decreases the service life and reliability of the device or machine. Moreover, at the same time the increase of the dynamic value of the gap increases the values of the friction force with linear motion as well as with rotation.

The above-mentioned drawbacks of the prior art are obviated by a hydrostatic sliding element in accordance with the invention, which consists of a body, the sliding surface of which is formed by a packing ring, on the outer or inner circumference of which auxiliary rings provided with intermittent grooves are situated. Such rings are separated from the packing ring by means of a groove. The principle of the invention resides in the use of a correction ring with a round central correction recess therein, the central recess being limited by an inner diameter of the packing ring, the correction ring being separated from the packing ring by a circular groove connected to inlets of pressure liquid.

The advantage of the hydrostatic sliding element according to the invention resides in the fact that is prevents the dynamic rigidity of the sliding element from being diminished and thus increasing the gap deviation between the sliding element and the supporting plate. This is advantageous for decreasing friction and flow losses. Moreover, this effect is reached in the area wherein the frequency of the exciting force and the proper frequency of the sliding element are approximately equal.

Figure 2:
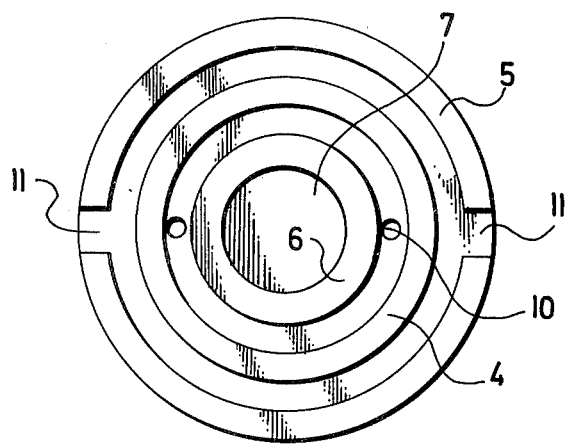

In order that the invention may be clearly understood and readily carried into effect, a preferred embodiment thereof is, by way of example, hereinafter more fully described and illustrated in the accompanying drawings, in which:

FIG. 1 is a view partially in radial section and partially in elevation of the sliding element with a part of a supporting plate therefor, and FIG. 2 is a view in bottom plan of the sliding element.

The illustrative hydrostatic sliding element of the invention has a body 1, the sliding surface of which includes a packing ring 4. On its outer circumference there is situated an auxiliary ring 5 provided with intermittent grooves 11 and separated from the packing ring 4 by a groove. In a round central recess limited by an inner diameter of the packing ring 4 there is provided a correction ring 6 with a central correction recess 7 centrally therewithin. The correction ring 6 is separated from the packing ring 4 by a circular groove 8, which is connected to inlets 10 of the pressure liquid.

During its operation, the hydrostatic sliding element, rotating in an angle speed around its axis of symmetry, moves with a forward velocity with respect to its supporting plate 2 and with a variable velocity in the direction of the axis of symmetry of the body 1 of the sliding element. In a steady-state condition, the liquid flows through the first resistance made by the inlet 10 of the liquid, the around the circular groove 8, which represents a hydraulic capacity, and then through the second resistance provided by the space between the packing ring 4 and the supporting plate 2, and then through a third resistance provided by a gap between the auxiliary ring 5, radial grooves 11, and supporting plate 2; simultaneously a flow through a fourth resistance takes place, such fourth resistance being provided by the gap between the correction ring 6 and supporting plate 2 into the central correction recess 7. The exciting force is balanced by a force caused by liquid pressure onto the surface limited by the outer circumference of the packing ring 4. Chamber pressure in the circular groove 8 and correction pressure in the central correction recess 7 is equal with a constant exciting force, and in comparison with the feeding pressure it is lower, viz. the lowering is represented by a pressure drop when liquid flows through the first resistance.

With a variable exciting force, which arises e.g. by the effect of a moving mass, eventually of a pressure variable in time and acting upon a piston of an axial piston machine combined with the sliding element, and which is greater than the balancing force, the sliding element moves in the direction of the axis of symmetry at a variable velocity. Besides pushing the liquid out of the space under the packing ring 4 and the auxiliary ring 5, the liquid is also pressed both in the circular groove 8 and in the central correction recess 7 and in the space under the correction ring 6. In this way, the balancing force is affected in the sense of decreasing the dynamic height of the gap between the sliding element and the supporting plate 2. An analogous function takes place in case the exciting force variable in time is smaller than the balancing force, and so the sliding element moves in the direction from the supporting plate 2 in the direction of the axis of symmetry in a variable velocity. A correct selection of the fourth resistance, and of the capacity of the central correction recess 7 with respect to parameters of the sliding element and to its connected parts, makes it possible to diminish a dynamic deviation of the gap, and in this way, with the motion of the sliding element with a forward velocity, the friction force as well, simultaneously, the value of the friction moment with the rotation of the sliding element in an angle velocity is decreased.

The hydrostatic sliding element according to the invention may be applied as a sliding element of a piston of an axial hydrostatic generator or motor, having a variable or constant geometrical volume, which works under high pressure and speeds of revolution.

Although the invention is illustrated and described with reference to one preferred embodiment thereof, it is to be expressly understood that it is in no way limited to the disclosure of such preferred embodiment, but it is capable of numerous modifications within the scope of the appended claims.

We claim:

1. A hydrostatic sliding element consisting of a body, the sliding surface of which is formed by a packing ring, on a circumference of which there is disposed an auxiliary ring provided with intermittent grooves, the auxiliary ring being separated from the packing ring by means of a groove, a correction ring with a central correction recess, the correction ring being separated from the packing ring by a circular groove connected to inlets of pressure liquid.

2. The element of claim 1, wherein the auxiliary ring is disposed on the outer circumference of the element.

3. The element of claim 2, wherein the intermittent grooves extend generally radially inwardly from the outer circumference of the element.

* * * * *